Oct. 5, 1926.

R. K. JACK 1,601,801

TIMING GEAR MOUNTING

Filed Jan. 28, 1926

Inventor
Robert K. Jack

By Blackmore, Spencer & Flint
Attorneys.

Patented Oct. 5, 1926.

1,601,801

UNITED STATES PATENT OFFICE.

ROBERT K. JACK, OF LANSING, MICHIGAN, ASSIGNOR TO GENERAL MOTORS CORPORATION, OF DETROIT, MICHIGAN, A CORPORATION OF DELAWARE.

TIMING-GEAR MOUNTING.

Application filed January 28, 1926. Serial No. 84,347.

This invention aims to improve the mounting of the timing gears of a gas engine.

An object is to mount the timing gears so as to render them substantially noiseless.

A further object is to take all the deflections and inaccuracies of the cam shaft and the crank shaft in the bearings instead of through the timing gears, thereby freeing the timing gears from any possible distortion.

A still further object consists in mounting a timing gear on a shaft bearing and driving by means of dogs keyed to the end of the shaft and engaging the gear.

Figure 1:
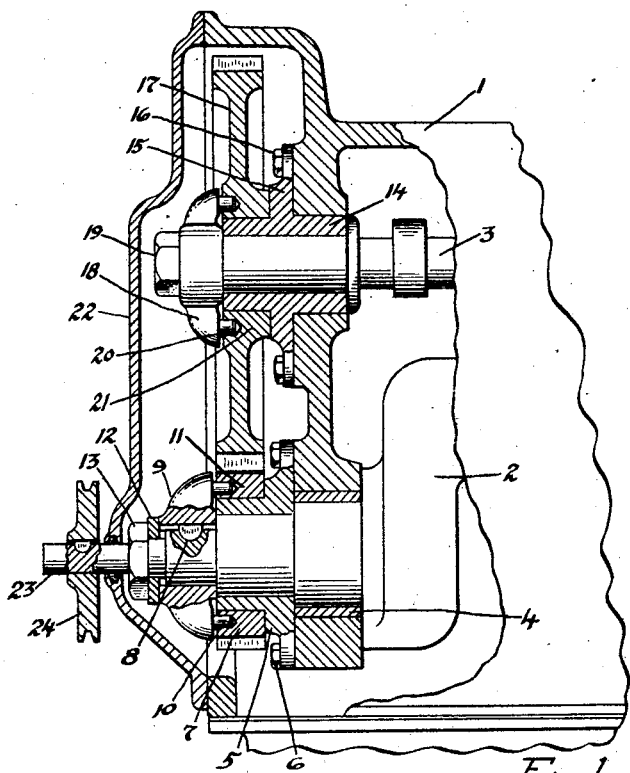
Figure 2:
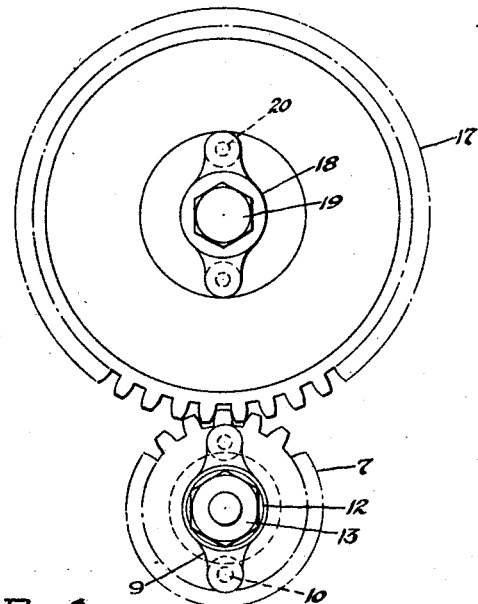

One embodiment of the invention is shown in the accompanying drawing, wherein Figure 1 is a vertical section through the front end of the crank case. Figure 2 is a front elevation, showing the timing gears and the driving dogs.

Referring to the drawing, numeral 1 is a crank case of an internal combustion engine. Within this crank case is the usual crank shaft 2 and cam shaft 3. The crank shaft is mounted in bearing 4 in the front wall of the crank case. Just outside this bearing the crank shaft is reduced and extends through a bearing member 5 secured by suitable fastening means 6 to the front wall of the crank case. Rotatably mounted on the outer face of this bearing 5 is a timing gear 7, this being the smaller of the two timing gears. For the purpose of driving this timing gear, the crank shaft is extended beyond the bearing and keyed thereto as at 8 is the driving dog 9. The dog 9 has studs 10 projecting inwardly therefrom and entering recesses 11 provided in the face of the gear 7. A suitable lock washer 12 and nut 13 maintain the dog in position on the crank shaft.

Above the crank shaft and in axial alignment with the cam shaft 3 is a sleeve member 14. This sleeve member has a centrally disposed flange 15 by which it is secured to the crank case, fastening means 16 being made use of for this purpose. This sleeve 14 extends through the wall of the crank case and serves as a bearing for the crank shaft. Rotatably mounted on the outer end of the sleeve is the second timing gear 17. This second timing gear is of course the one of larger diameter and is of such size as to properly engage timing gear 7. For driving the cam shaft from this second timing gear means is employed similar to that connecting the first timing gear to the crank shaft. A driving dog 18 is secured in any convenient way to the end of the cam shaft and is held in position by a nut as at 19. The driving dog is provided with studs 20 to engage suitable recesses 21 in the face of the timing gear.

The timing gear may be covered as usual with a front plate 22 through which the crank shaft may be extended as at 23 and provided with a keyed pulley 24 for operating the fan belt.

The advantages resulting from this method of mounting the timing gears are self evident. The inaccuracies and deflections of the shafts are taken by the bearings and are not transferred to the gears. The clearance provided between the studs and the recesses in the gears insures the free rotation at all times of the gears on the sleeve portions of the bearings. A substantially noiseless timing gear is thus provided and wear is reduced to the minimum.

I claim:—

Means for driving a cam shaft from a crank shaft comprising a crank case, the crank case having a bearing for the crank shaft, a bearing in axial alignment therewith secured to the crank case and through which bearing the crank shaft passes, a gear rotatably mounted thereon, a driving dog keyed to the projecting end of the crank shaft and having means in driving engagement with the gear, a cam shaft bearing and a gear thereon engaging the crank shaft gear and means for driving the cam shaft from its gear.

In testimony whereof I affix my signature.

ROBERT K. JACK.